(12) United States Patent
Kilian et al.

(10) Patent No.: US 6,415,639 B1
(45) Date of Patent: Jul. 9, 2002

(54) LASER-ASSISTED BENDING METHOD

(75) Inventors: Friedrich Kilian, Kematen a.d. Krems; Kurt Schröder, Perchtoldsdorf; Dieter Schuöcker, Vienna, all of (AT)

(73) Assignee: Trumpf Maschinen Austria GmbH & Co. KG, Pasching (AU)

( * ) Notice: Subject to any disclaimer, the term of this patent is extended or adjusted under 35 U.S.C. 154(b) by 0 days.

(21) Appl. No.: 09/446,682

(22) PCT Filed: Jul. 2, 1998

(86) PCT No.: PCT/AT98/00163

§ 371 (c)(1),
(2), (4) Date: Feb. 7, 2000

(87) PCT Pub. No.: WO99/01239

PCT Pub. Date: Jan. 14, 1999

(30) Foreign Application Priority Data

Jul. 2, 1997 (AT) .............................................. 1129/97

(51) Int. Cl.⁷ .................................................. B21D 5/01
(52) U.S. Cl. ..................................................... 72/342.1
(58) Field of Search ........................ 72/342.1; 372/55; 219/121.6

(56) References Cited

U.S. PATENT DOCUMENTS

| | | | | |
|---|---|---|---|---|
| 3,534,462 A | * | 10/1970 | Cruickshank et al. | .... 219/121.6 |
| 3,842,364 A | * | 10/1974 | Srinivasan | .................... 372/55 |
| 3,922,899 A | * | 12/1975 | Fremont et al. | ........... 72/342.1 |
| 4,068,196 A | * | 1/1978 | Hohla et al. | ................... 372/55 |
| 4,539,461 A | * | 9/1985 | Benedict et al. | ......... 219/121.6 |
| 5,359,872 A | | 11/1994 | Nashiki | |

FOREIGN PATENT DOCUMENTS

| | | |
|---|---|---|
| AT | E 138 837 T1 | 9/1992 |
| DE | 877 617 C | 5/1953 |
| DE | 42 28 528 A1 | 3/1993 |
| EP | 0 536 683 A1 | 4/1993 |
| EP | 0 549 357 A1 | 6/1993 |

OTHER PUBLICATIONS

Patent Abstracts of Japan, Aug. 11, 1993, vol. 017, No. 433, (M–1416) & JP 05 096329 A (Amada Co Ltd), Apr. 20, 1993.

* cited by examiner

Primary Examiner—Lowell A. Larson
(74) Attorney, Agent, or Firm—Alston & Bird LLP

(57) ABSTRACT

The subject matter of the invention is a process for bending a component, e.g. a metal sheet (1) by means of a mechanical force with selective heating by means of a laser beam (6). From one laser beam (6) or several laser beams (6) a radiation field (7, 21) is shaped to form a linear heating zone (9) and at all points along a bend line (8) acts upon the component.

4 Claims, 3 Drawing Sheets

LASER-ASSISTED BENDING METHOD

Figure 1:
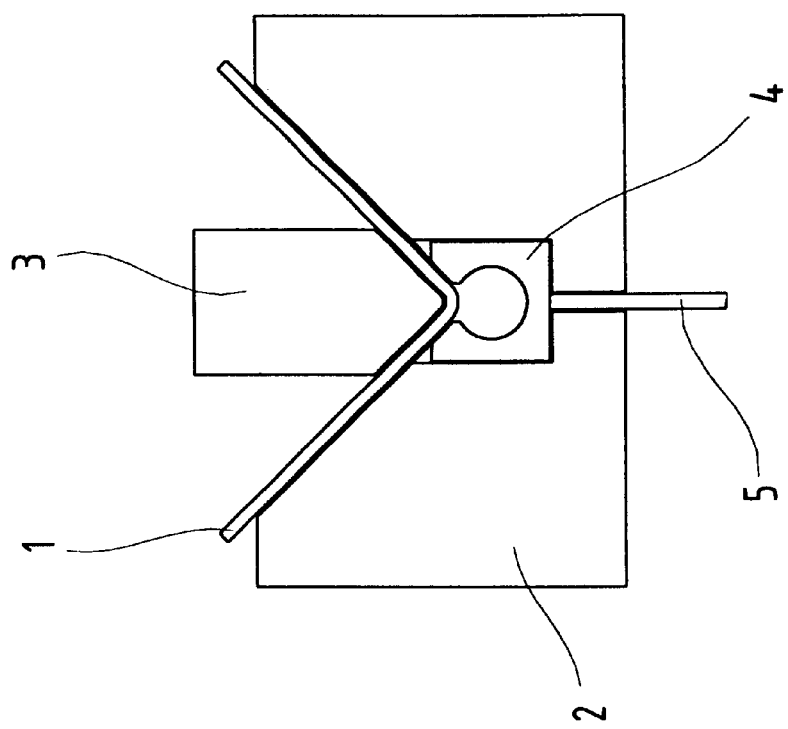

The invention relates to a process for bending a component by means of mechanical force with the simultaneous selective heating of the component along the bending edge by means of a laser beam.

On bending in a V-die the metal sheet to be bent is firstly laid across a die of width w in a known manner, after which a bending punch is applied in the middle between the end points of the V acting as supports. The effect of the force produced by this stamp and the reaction forces produced thereby in the support points produce a bending moment in the metal sheet, by which the sheet bends, as a result of which the punch moves further in the direction of the vertex of the die. In the first phase of the bending process free bending is performed, which means that the bend line is determined only by the moment distribution in the metal sheet and neither the sides of the die nor the shape of the punch apart from the rounded edge in contact with the metal sheet have any influence. The influence of the die and the punch is only noticeable when the metal sheet due to the bending radius becomes detached from the original support points on the die and the latter move along the sides in the direction of the vertex. In this case gradually a positive contact is formed between the die and punch which produces the low springback characteristic of die bending or the precisely defined bend radius. This second phase of die bending is also called post-moulding or post-stamping. This phase is characterised by a significant increase in the force to be applied by the press.

The applicability of die bending is limited on the one hand by material properties such as fracture strain and yield stress and on the other hand by geometric conditions such as die width and the dimensions of the metal sheet. As the known theory of bending shows, the bending force required during free bending is proportional to the yield stress, the width of the metal sheet and the square of the thickness of the metal sheet so that with a maximum pressure force defined by the construction of the press there are limits with respect to the material properties and/or the die dimensions. In the stamping phase the force is only linearly dependent on the sheet thickness, whereby overall the force requirement is greater by a factor of 30 than during free bending.

A further limitation is the fracture strain, in that if the latter is exceeded tears appear on the bend edge. As the known theory of bending also shows, the critical load occurs in the outermost fibre of the bent component, whereby the strain produced there is dependent on the reciprocal value of the bending radius. A small bending radius—and this is mostly desirable in practice—requires a high value for the fracture strain.

It is a known fact about materials that yield stress generally falls with component temperature, whereas fracture strain increases. Exceptions are materials, such as steel which have a distinct blue shortness, for which the former statement only applies above a limit temperature (in the order of 200° C.) characteristic of the respective material.

The temperature behaviour of yield stress therefore makes it obvious to heat the material before or during the bending process in a known manner, so that the minimum possible bending radius or the required maximum force are reduced. The heating of the whole component is not practical however, as this requires a lot of energy, leads to distortion or oxidation and causes undesirable changes in the structure of the material. To avoid problems associated with heating the entire component, it is known to be possible to heat the component selectively by means of a laser beam, that is to supply energy only to the points at which the actual shaping process occurs in the component. In the case of die bending this is a linear region along the bending edge, whereby the outer zone, that is the region in which maximum tensile stress occurs in the metal sheet, reacts particularly favourably to heating, as tears are to be expected there first of all as a result of exceeding the tensile strength.

In U.S. Pat. No. 5,359,872 A and in DE 42 28 528 A1 according to these observations a metal sheet securely clamped on the one side and held on the other side by a robot is periodically traced over by a laser beam along the desired bend line at high speed, whereupon the robot applies a bending force and the bends the metal sheet along the preheated bend line. A disadvantage in this case however is that because of the pendulum movement of the laser beam the individual points on the bend line are only heated for a short time by the laser beam, producing a periodically fluctuating temperature field which in addition also shows phase displacement along the bend line. By means of a high frequency pendulum movement it can be ensured that these temperature fluctuations remain sufficiently small. In particular however due to the short acting high intensities localised overheating can occur, in extreme cases even to the stage of melting—or it can result in too high cooling speeds, which affects the metallurgical properties of the metal sheet unfavourably in the region of the bend line. This problem becomes more serious the greater the laser power to be applied, i.e. the thicker the metal sheets or the longer the bend lines. A further disadvantage is that due to the geometric properties the laser beam only acts on the side with pressure on the component, whereby it is known that the critical zone on bending is the one with maximum tensile stress, which can cause the formation of tears on falling below the minimum bend radius. To produce the above described pendulum movement in addition to the optical converter device described in DE 42 28 528 A1, reflectors mounted helically on a support roller are also suitable, as shown in EP 0 536 683 A1.

In order to completely avoid disadvantageous periodical temperature fluctuations occurring according to U.S Pat. No. 5,359,872 A and DE 42 28 528 A1, the heating must be provided along the bend line by a laser beam shaped into a burn line. In order to shape the laser beam in this way numerous solutions are known. The method described in AT 138 837 B uses a combination of cylindrical mirrors and lenses in order to produce a linear focus with which a continuous metal sheet is heat-treated along its width, in order to influence its magnetic properties favourably. Other possibilities are described e.g. in EP 0 549 357 A1 which can be used both for laser beams and for radiation from conventional lamps. The high energy losses occurring in several of the optical systems introduced in EP 0 549 357 A1 for guiding the beam are thus clearly easy to accept, as the radiation necessary to process fabrics and plastics is low. Because of the geometric design of a device for bending and the high radiation output required the said processes are not suitable for shaping a linear heating zone.

According to the present invention the problem of periodically fluctuating temperature distribution is avoided, in that the laser beam is supplied as a linear radiation field to each point on the bend line. By this measure at all times on each point of the bend line conditions are identical, so that the bending process is completely homogeneous over the length of a component. To produce the linear radiation field and supply the radiation field to the bend line according to the invention the devices for shaping the radiation and bringing it into the devices required for bending for introducing the mechanical force are integrated. Preferably, the present invention can be applied for the process of die bending, so that mechanical forces are transferred by bending punch and bending die onto the component. An additional advantage of the present process is the fact that the laser beam now contacts the side of the component with the maximum tensile stress.

The feeding of the laser beam onto the surface of the component opposite the bending punch is performed in an embodiment of the invention by a system of cylindrical lenses and/or cylindrical mirrors. In this case the known laws of optics are used, which make it possible by means of two cylindrical lenses and/or mirror with axes in normal position to influence the divergence and the width diameter of a laser beam into two normal positioned transverse directions. By means of the corresponding design of the optical system according to the invention a linear radiation field and thereby a heating zone is produced along the bend line, which is calculated so that it is covered by the region in which the plastic deformation of the material to be bent is performed.

A further design of the invention is based on the use of a known slotted hollow conductor. A hollow conductor made of copper for example is able to transfer the beam of a $CO_2$ laser with low losses, which is based on the low-loss multiple reflection inside the hollow conductor. By inserting a slot a level of power dependent on the relationship between the slot width and the circumference of the hollow conductor is decoupled from the hollow conductor, whereby this portion then contacts the material, for example steel, and is reflected. As reflection losses in steel are considerably greater than in copper, viewed over the entire length of the bending edge a large proportion of the power originally coupled into the hollow conductor is absorbed. To adjust to the power coupled per length unit into the component apart from the laser power, the gap width and the inner diameter of the hollow conductor are available, whereby both parameters can also vary with the length. To reduce losses in the hollow conductor or to ensure low losses over a long time period, there is the option of polishing the inside of the hollow conductor in a known manner and flushing it with a flow of gas in axial direction. As the axial power density in the hollow conductor is reduced as a result of absorption by the component, according to the invention it is also possible to couple the laser beam from both sides of the hollow conductor into the latter.

In order to produce a good contact between the component and the hollow conductor it is also possible according to the invention to press the hollow conductor by a support with elastic force against the bending edge, so that the latter always lies positively on the bend edge. In the region of the vertex of the die a recess is then provided which mounts the hollow conductor in the end phase of the bending process, so that in the end the bending die, bending punch, metal sheet and hollow conductor are in positive contact with one another.

In a further embodiment of the invention several linear radiation fields produced by a cylindrical optical system or by a hollow conductor are arranged consecutively or overlapping. The larger number of laser beams necessary for this purpose is produced either by a single laser beam of high power divided according to known methods or by several lasers of low power.

It is also possible according to the invention by selecting the mode of operation of the laser, such as continuous wave or pulsed, to adjust the heating and cooling flows in the material. All points of the bend line are in this case contact simultaneously with laser radiation.

Lastly, a process is advantageous in which linear radiation fields are guided through the upper and lower die of the bending die, and to form an even heating zone for the opposite surfaces of the component are fed along the bend line, whereby for the bending due to the properties of the material only certain suitable materials can be processed and also components which have a greater thickness.

The invention is described in the following by way of the embodiments shown in the Figures.

Figure 2:
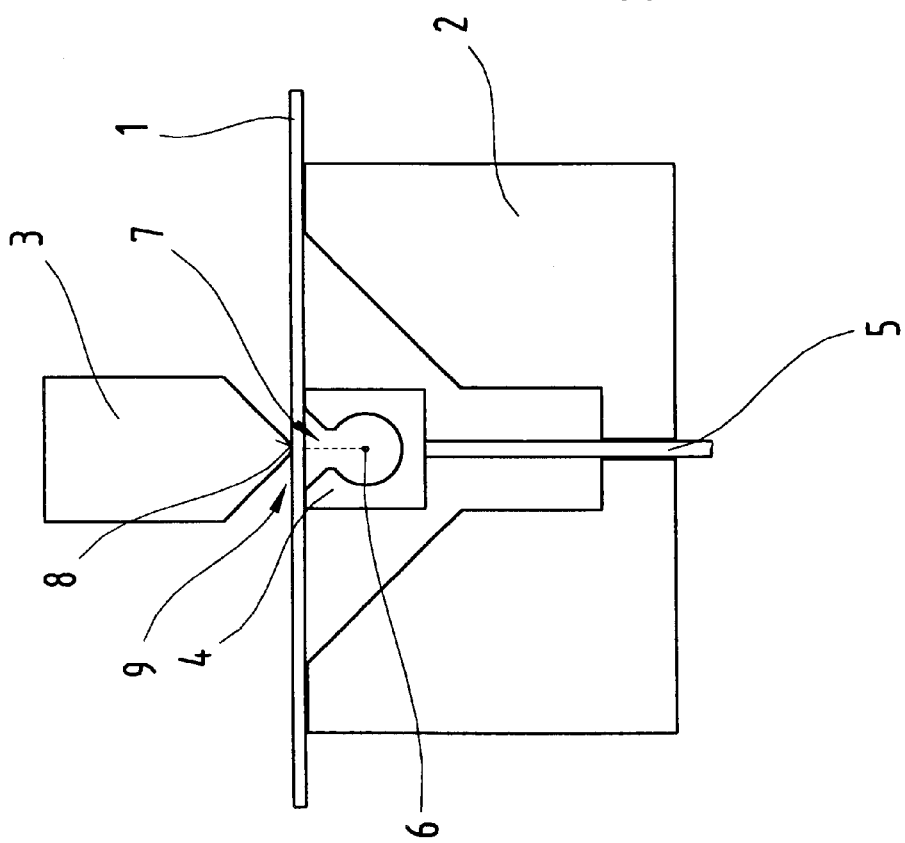
Figure 4:
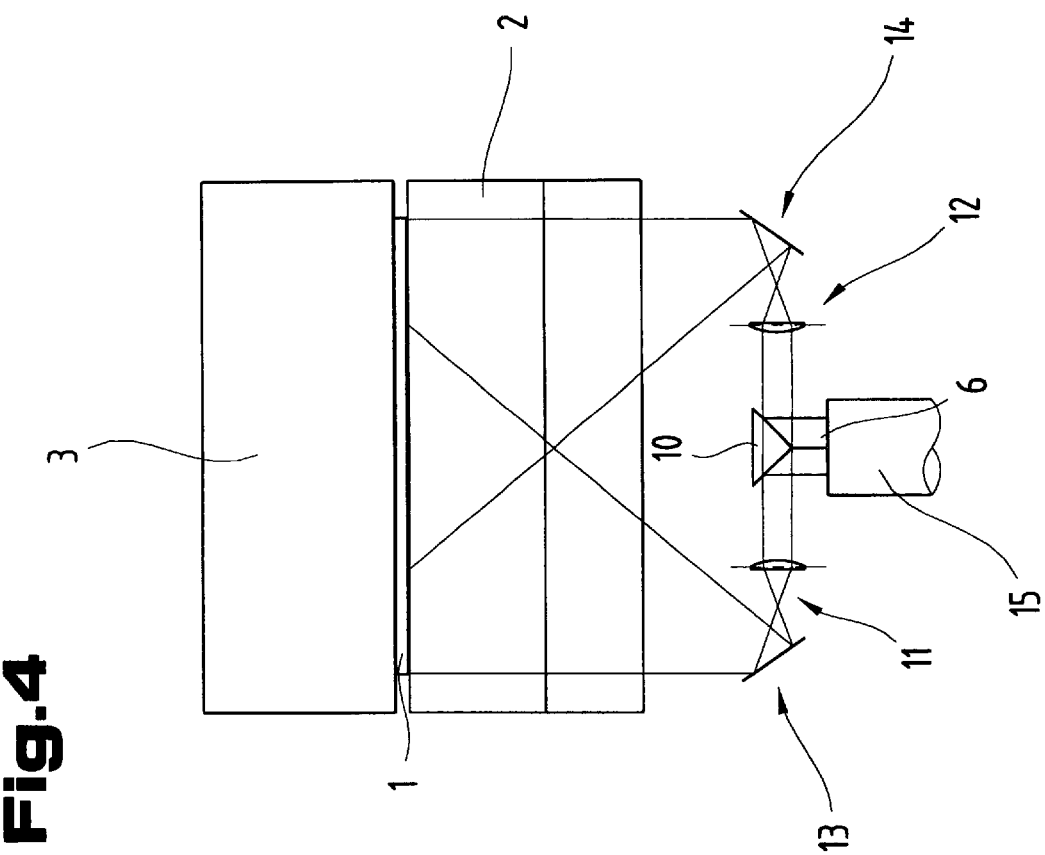
Figure 3:
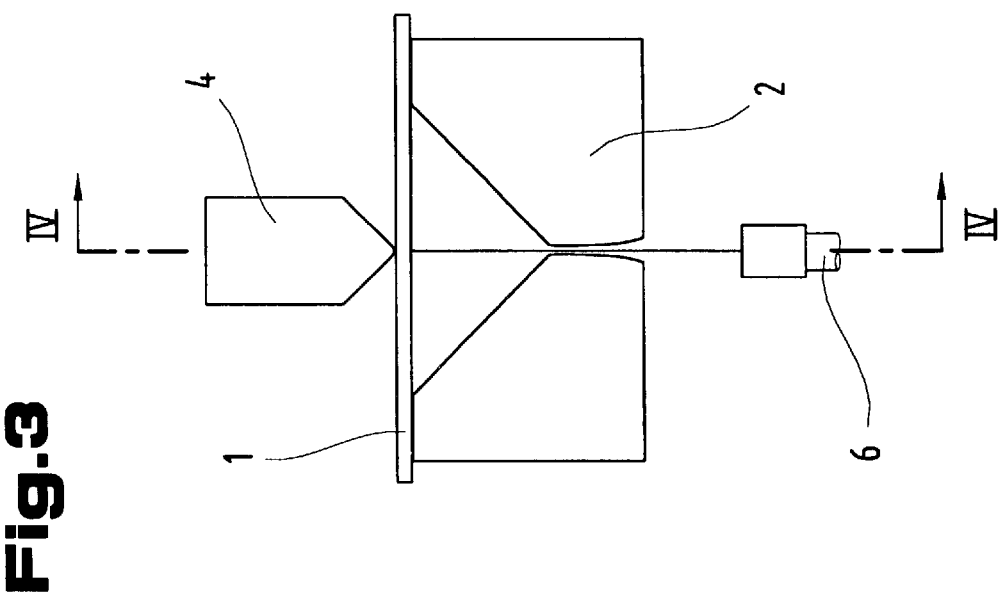
Figure 5:
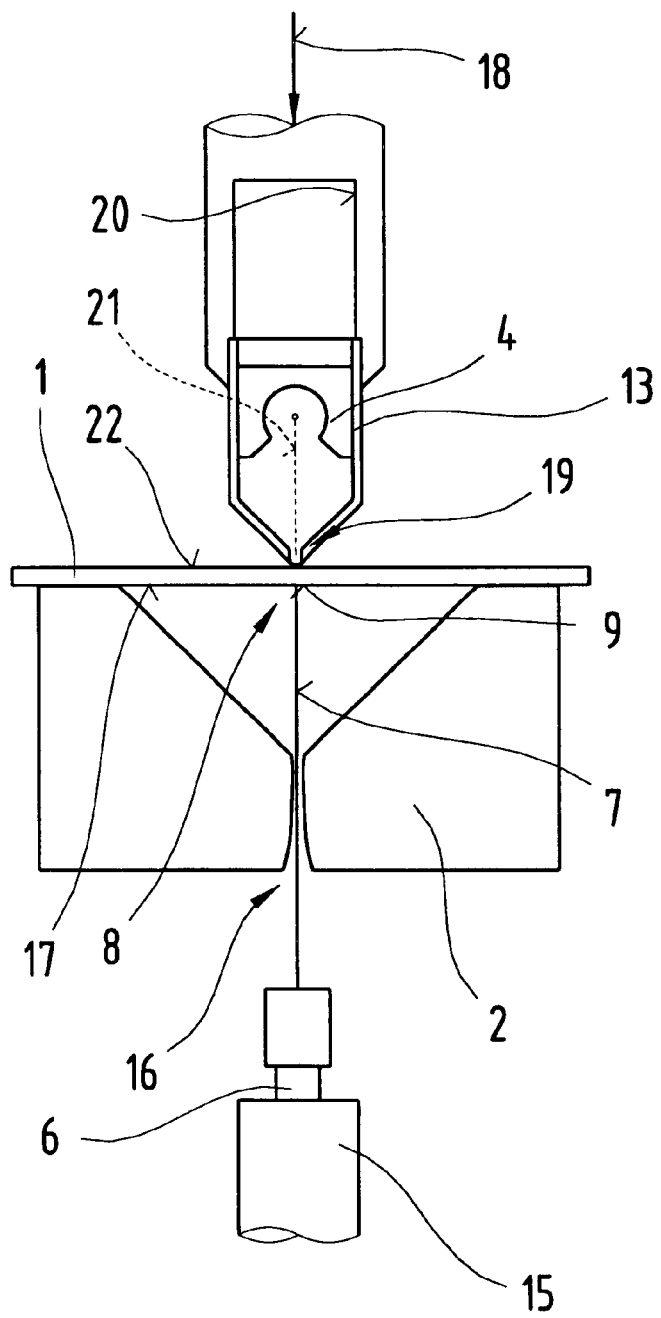

Shown are:

FIG. 1 a device for performing the process according to the invention;

FIG. 2 the device according to FIG. 1 after the process has been performed;

FIG. 3 a device for performing a further variation of the process according to the invention;

FIG. 4 the device according to FIG. 3 in side view;

FIG. 5 a device for performing a further variation of the process according to the invention.

First of all it should be noted that in the variously described embodiments the same parts are given the same reference numbers or the same component names, whereby disclosures contained throughout the entire description can be applied to the same parts with the same reference numbers or same component names. In addition, the position details used in the description, such as e.g. top, bottom, side etc. are related to the Figure being described or illustrated at the time and with a change of position should be associated with the new position. Furthermore, individual features or combinations of feature of the shown and described different embodiments can also represent independent solutions according to the invention.

FIG. 1 and FIG. 2 show an example of an embodiment for a device for performing the process according to the invention for bending a component, in which a hollow conductor for laser beams is used to heat the component. In FIG. 1 the position is shown immediately before the bending process, in FIG. 2 after the bending process. At the beginning of the bending process a component, e.g. a metal sheet 1 lies firstly on a die 2, whereby a bending punch 3 is applied onto the metal sheet 1 from above. From below a slotted hollow conductor 4 is pressed by a support 5 onto the metal sheet 1. In the bending process a laser beam 6 for heating the component is decoupled in longitudinal direction into the hollow conductor 4, whereby a linear radiation field 7 is formed, which along an intended bend line 8 forms a heating zone 9 on the component and at the same time presses the bending punch 3 onto the metal sheet 1, whereby the latter is bent. The slotted hollow conductor 4 is thus pressed according to the invention by the support 5 during the bending process against the metal sheet 1, whereby the latter remains constantly in the same position relative to the bend edge. In the end position—as shown in FIG. 2—the metal sheet 1 is located positively between the die 2, bending stamp 3 and hollow conductor 4, whereby the hollow conductor 4 is now located in its lowest position in a recess in the die 2.

FIGS. 3 and 4 show a further embodiment of a device for performing the process according to the invention. The metal sheet 1 is again placed onto the die 2, whilst the bending punch 3 presses from the opposite side along the bend line onto the component. The laser beam 6 is divided into two radiation fields by the radiation shaping optics comprising a prism mirror 10, two cylindrical lenses 11, 12 and two cylindrical reflecting mirrors 13, 14, which respectively produce a linear heating zone on the metal sheet 1. The unshaped laser beam is in this case fed through a slot-shaped opening in the underside of the die 2 to the component. Suitable radiation generators 15 are all devices known from the prior art with few restrictions.

In FIG. 5 a device for a variation of the process according to the invention for bending the metal sheet 1 is shown. Before or during the bending process, in which the bending element 3 is moved in the direction of the die 2, by means of a slot-shaped opening 16 in the die 2 the radiation field 7, as described already in FIG. 3 and 4 is supplied onto a surface 17 facing the die 2 to form the heating zone 9 along the bend line 8. The bending punch provided to apply the force according to arrow 18 also has a slot-shaped opening 19 running along the bend line 8. The hollow conductor 4 is arranged in a recess 20 in the bending stamp 3 via which an additional radiation field 21 is put into effect through the slot-shaped opening 19 to act along the bend line 8 on the surface 22 of the metal sheet 1 opposite the surface 17.

This process is particularly suitable for bending components or materials that have difficult material properties. According to this process varying temperatures can be reached in opposite heating zones along the bend line 8, e.g. a higher temperature in the critical tensile region, which is formed facing the die on the surface 17 than a lower temperature in the pressure region along the surface 22.

For form's sake it should be pointed out that for a better understanding of the structure of a device for performing the process according to the invention the latter or its components are represented untrue to scale and/or enlarged and/or reduced in size.

The objective underlying the independent solutions according to the invention can be inferred from the description.

Above all the individual designs shown in FIGS. 1, 2; 3, 4 and 5 can form the subject matter of independent solutions according to the invention. The objectives and solutions relating thereto according to the invention are taken from the detailed descriptions of these figures.

List of Reference Numbers

1. Metal sheet
2. Die
3. Bending punch
4. Hollow conductor
5. Support
6. Laser beam
7. Radiation field
8. Bend line
9. Heating zone
10. Prism mirror
11. Cylindrical mirror
12. Cylindrical mirror
13. Reflecting mirror
14. Reflecting mirror
15. Radiation generator
16. Opening
17. Surface
18. Arrow
19. Opening
20. Recess
21. Radiation field
22. Surface

What is claimed is:

1. A process for forming a permanent bend in a bendable component, comprising:

irradiating a surface of the component with a linear radiation field of laser radiation, the linear radiation field extending along a bend line about which the component is to be bent, such that all points along the bend line are simultaneously irradiated by the laser radiation so as to locally heat the component along the bend line; and applying mechanical force to the component to bend the component along the bend line, wherein the linear radiation field is formed by directing a laser beam into at least one end of an interior passage of a tubular conductor having an axial slot formed in a wall thereof, the conductor emitting a linear radiation field from the slot onto the component, wherein the conductor is positioned in a recess in a bending die on which the component is supported, and the conductor is positioned in contact with the component during irradiation and bending of the component.

2. The process of claim 1, wherein the component is bent into a V shape at the bend line so as to form a vertex extending into the recess in the bending die, and wherein the conductor is maintained in contact with the component as the vertex is formed and extends into the recess.

3. A process for forming a permanent bend in a bendable component, comprising:

irradiating a surface of the component with a linear radiation field of laser radiation, the linear radiation field extending along a bend line about which the component is to be bent, such that all points along the bend line are simultaneously irradiated by the laser radiation so as to locally heat the component along the bend line;

irradiating an opposite surface of the component a long the bend line with a second linear radiation field of laser light; and applying mechanical force to the component to bend the component along the bend line, wherein the second linear radiation field is directed onto the component through a slot formed in a bending punch that contacts and presses the component to bend the component.

4. The process of claim 3, wherein the bending punch includes an internal cavity in which a tubular conductor is disposed, a laser beam being directed into at least one end of an interior passage of the tubular conductor, the conductor having an axial slot in a wall thereof from which a linear radiation field is emitted, the linear radiation field then passing through the slot in the punch onto the component.

* * * * *

UNITED STATES PATENT AND TRADEMARK OFFICE
CERTIFICATE OF CORRECTION

PATENT NO. : 6,415,639 B1
DATED : July 9, 2002
INVENTOR(S) : Kilian et al.

It is certified that error appears in the above-identified patent and that said Letters Patent is hereby corrected as shown below:

<u>Title page,</u>
Item [73], Assignee, after "KG" insert a period (.); "(AU)" should read -- (AT) --.

<u>Column 6,</u>
Line 41, "a long" should read -- along --.

Signed and Sealed this

Third Day of December, 2002

JAMES E. ROGAN
*Director of the United States Patent and Trademark Office*